United States Patent Office 3,489,741
Patented Jan. 13, 1970

3,489,741
FIBER-REACTIVE PHTHALOCYANINE AZO DYES CONTAINING β-HYDROXYETHYL SULFONE SULFURIC ACID ESTER, VINYL SULFONE OR SULFONYLUREA GROUPS
Harry W. Grimmel, Warwick Neck, R.I., assignor to American Hoechst Corporation, New York, N.Y.
No Drawing. Filed Feb. 14, 1967, Ser. No. 615,900
Int. Cl. C09b 47/04, 45/14, 45/24
U.S. Cl. 260—146                               13 Claims

ABSTRACT OF THE DISCLOSURE

Fiber-reactive phthalocyanine dyes of the formula

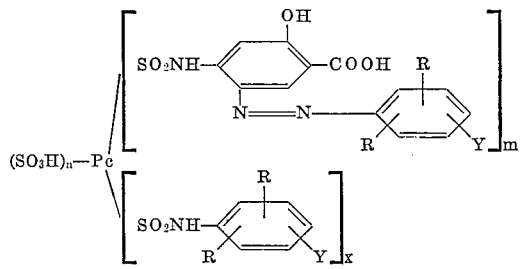

in which Pc represents a metalliferous phthalocyanine nucleus in which the —$SO_2NH$— and —$SO_3H$ groups are substituted in the 3- or 4-positions, R is H, lower alkyl or lower alkoxy, Y is

—$SO_2CH_2CH_2OSO_3H$, —$SO_2CH{=}CH_2$ or —$SO_2NHCONH_2$, $n$ is 0 to 3, $m$ is 1 to 4, $x$ is 0 or 1 and $m+n+x$ is 3 or 4. The dyes are suitable for dyeing leather, vegetable, animal and synthetic fibers and fabrics containing amino, imino or hydroxy groups, green shades of good fastness to washing and light, and process for preparing such dye.

SPECIFICATION

This invention is concerned with new water soluble fiber-reactive dyes substituted by one or several fiber-reactive groups, i.e., β-hydroxyethylsulfone sulfuric acid ester, vinyl sulfone, or sulfonylurea groups. They are derived from phthalocyanine sulfonic acids, contain at least one azo chromophore group and are suitable for the dyeing or printing of textile material to yield green to olive hues in accordance with procedures well known in the art of application of reactive dyes.

The new dyes correspond to the formula:

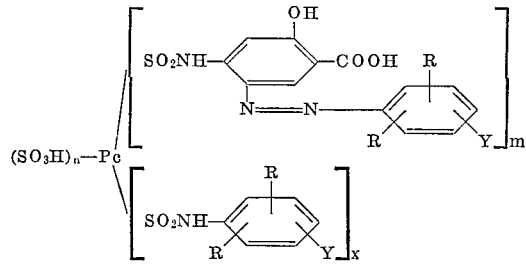

in which Pc represents a metalliferous phthalocyanine nucleus in which the —$SO_2NH$— or the —$SO_3H$ groups are substituted in the 3- or 4-positions, $n$ represents a number from 0 to 3, $m$ is a number from 1 to 4, $x$ stands for 0 or 1, and the sum of $n+m+x$ is 3 or 4; R stands for hydrogen, a lower alkyl, preferably methyl, or a lower alkoxy, preferably methoxy, and Y stands for

—$SO_2CH_2CH_2OSO_3H$, —$SO_2CH{=}CH_2$ or —$SO_2NHCONH_2$.

The dyes of the invention can be prepared by condensing a phthalocyanine sulfochloride of the formula

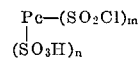

in which Pc, m and n have the above mentioned meanings, $m+n$ being 3 or 4, with para-amino salicyclic acid in an aqueous medium and in the presence of an acid binding substance, for example an alkali metal hydroxide, an alkaline earth metal hydroxide or an alkali metal carbonate. The intermediate so obtained can, if desired, be further condensed with an aminobenzene-β-hydroxyethylsulfone sulfuric acid ester or with an aminobenzene sulfonylurea which may be substituted in the benzene nucleus. The condensation product thus obtained is subsequently coupled, in a pH range of 5 to 7, with a diazotized aminobenzene-β-hydroxyethylsulfone sulfuric acid ester or with a diazotized aminobenzene sulfonylurea which may be substituted in the benzene nucleus.

As aminobenzene-β-hydroxyethylsulfone sulfuric acid ester or aminobenzene sulfonylurea which may be substituted in the benzene nucleus, there are used in the process of the invention for preparing the diazo compounds, for example, 1-aminobenzene-4-β-hydroxyethylsulfone sulfuric acid ester, 2-amino-anisol-4-β-hydroxyethylsulfone sulfuric acid ester, 2-amino-1,4-dimethoxy benzene-5-β-hydroxyethyl sulfone sulfuric acid ester, p-aminosulfonylurea or 3-amino-4-methoxy toluene-6-β-hydroxyethylsulfone sulfuric acid ester. Said amines may also be used for the above mentioned condensation with the intermediate prepared by condensation of the phthalocyanine sulfochloride with para-amino salicyclic acid.

Another embodiment of the process for the manufacture of the dyes of the invention consists in the condensation of a phthalocyanine sulfochloride in an aqueous medium and in the presence of an acid binding agent with one or more azo dyes of the formula

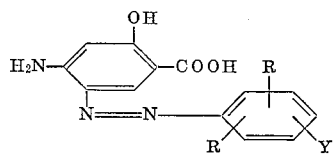

in which R and Y have the meanings given above and, if desired, with one molecular proportion of an aminobenzene-β-hydroxyethylsulfone sulfuric acid ester or of an aminobenzene sulfonylurea. One example of such an azo dye reactant is the dye having the formula:

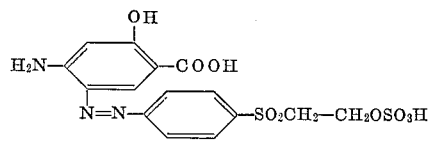

The phthalocyanine sulfochlorides that are suitable for the invention include copper- and nickel-phthalocyanines. Depending on the method of preparation, the sulfochloride groups are present in the 3- or 4-position of the phthalocyanine molecule. This is in turn contingent on whether the sulfochloride groups are introduced by direct sulfochlorination of the phthalocyanine molecule—which leads to substitution in the 3-positions—or whether a 4-sulfophthalic acid is used as starting material for preparing the phthalocyanine sulfochlorides. While the number of sulfochloride groups in the molecule may vary from 1 to 4, mixtures of phthalocyanines having different numbers of sulfochloride groups, depending on the reaction conditions, are usually obtained in the course of preparation and during isolation. At higher temperatures (140–150° C.), mainly tetrachlorosulfonated metal-phthalocyanines are found. Lower reaction temperatures yield di- and tri-chlorosulfonated products.

The process of the invention includes also reacting a mixture of two different azo dyes of the above mentioned formula with phthalocyanine sulfonyl chlorides or the coupling of different diazo benzene-β-hydroxyethylsulfone sulfuric esters or diazo benzene sulfonylureas with condensates of phthalocyanine sulfochlorides with p-amino salicylic acid.

Depending on the reaction temperature, which is kept between 0 and 35° C., and the agent added to neutralize the mineral acid formed during the condensation of the phthalocyanine sulfochloride with the p-amino salicyclic acid or the amino azo dye, hydrolysis of some sulfochloride groups during the reaction can be checked by mild reaction conditions or the simultaneous offering of fiber-reactive amino compounds such as 4-aminobenzene-β-hydroxyethylsulfone sulfuric acid ester which, under certain conditions, will condense faster than the hydrolysis of the sulfochloride proceeds. Yet, it is not absolutely necessary that all of the sulfonic acid chloride groups condense. For reasons of solubility and exhaust properties of the dyes in certain dyeing operations, the presence of one or more free sulfonic acid groups is of benefit as long as the fastness against wet processing is not unduly impaired.

Depending on the choices of the phthalocyanine sulfochloride used and the number (1 to 4) of p-amino salicylic acid radicals offered, as well as on the substituents carried by the diazophenyl group, there are obtained dyes with different tinctorial properties. The greater the number of fiber-reactive groups in the finished dye molecule, the more pronounced is the increased fastness against wet processing of the dyeing or print made with the dyes of the invention. The new dyes yield bright green to dark olive hues and, in the form of their alkali metal salts, they are easily soluble in water; they are suitable for dyeing or printing vegetable, animal or synthetic fibers and fabrics containing amino, imino or hydroxy groups, for example, cotton, native and regenerated cellulose, wool, silk, polyamide and polyurethane fibers, as well as leather. They can be improved further by treatment with metallic salts, like chromium or copper salts, either after or during the dyeing or printing process according to methods known in the art. The results of such treatment is an increase in the depth of shade and brilliancy of hue.

The following examples illustrate the invention, the parts being by weight:

EXAMPLE 1

57.6 parts (0.1 mol) of copper phthalocyanine are dissolved in 300 parts of chlorosulfonic acid with a rise in temperature from 20 to 65° C. The temperature is then raised to 135–140° C. and kept at this temperature for 5 hours. After cooling to 40° C., 40 parts of thionylchloride are added and the reaction mass brought once more to 90° C. After several hours standing, the reaction mixture is drowned in a mixture of 500 parts of water and 1500 parts of ice, filtered and washed free of acid (congo acid reaction). The filtrate of copper phthalocyanine tetrasulfochloride is slurried in a mixture of 300 parts of ice and water added incrementally while agitating to a neutralized solution of 46 parts (0.3 mol) p-amino salicyclic acid in 600 parts of water, to which 33 parts of sodium bicarbonate and 1 part of pyridine have been added. The condensation proceeds smoothly at a pH of 6.5 to 6.9 and is finished within 1 hour. The condensation product is salted out with 300 parts of sodium chloride, filtered and washed free of unreacted p-amino salicylic acid.

The filtercake is redissolved in 500 parts of water to which 35 parts of sodium bicarbonate have been added.

In the meantime, a diazo solution is prepared from 42 parts of 1-aminobenzene-4-β-hydroxyethylsulfone sulfuric acid ester in the usual way with the use of 35 parts of conc. hydrochloric acid and 11 parts of sodium nitrite. The diazo compound is added to the solution of the aforementioned condensate over a period of 3–4 hours. Coupling proceeds in the usual way at a temperature of 15–25° C.

After stirring overnight, the obtained dye is salted out by the addition of 250 parts of sodium chloride and filtered. It is dried at 70° C. and ground to a dark greyish-green powder which is easily soluble in water with a full green color.

The dye is well suited for printing and dyeing textile fibers. Thus, there are obtained from salt-containing baths in the cold or in the hot, with the aid of an alkaline compound, on native and regenerated cellulose fibers, bright green dyeings of very good fastness to wet processing and light. A good dyeing result is also obtained when the fibers are impregnated with an aqueous solution of the dye and the material so treated is reacted in the cold or in the hot with an alkaline compound which may also be applied to the material prior to, simultaneously with, or after the dye. Depending upon the temperature conditions and the alkaline compound used, the duration of the dyeing process may vary from a few seconds to 24 hours. The dye is also suitable, with proper selection of alkaline compound, for the dyeing of wool, silk, leather, polyamide and polyurethane fibers.

By varying the amount of p-amino salicylic acid and diazo compound from 1-aminobenzene-4-β-hydroxyethylsulfone sulfuric acid ester in relation to the copper phthalocyanine sulfochloride, dyes with different properties of wet fastness and hue are obtained. Thus, a dye with only 1/10 mol of p-amino salicylic acid offered per 1/10 mol of copper phthalocyanine sulfochloride possesses a lighter, bluer hue than dyes with 2/10 or 3/10 mol of p-amino salicylic acid. Conversely, the fastness against wet processing increases with the number of fiber-reactive groups in the molecule. As a good compromise between desirable hue, brightness and good fastness against wet processing, the dye obtained by reacting 0.1 mol of copper phthalocyanine tetrasulfochloride with 0.2 mol p-amino salicylic acid and coupling same with the corresponding amount of 1-diazobenzene-4-β-hydroxyethylsulfone sulfuric acid ester is of special interest. It has the following formula, expressed as the free acid.

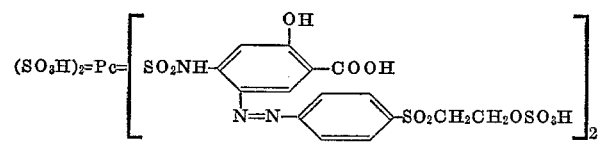

On cotton, dyed or printed, it yields bright green hues with a slightly bluish cast which have good properties of fastness against wet processing and light. A chromatographic analysis shows the picture of a uniform dye.

When copper phthalocyanine trisulfochloride, instead of the tetrasulfochloride, is condensed according to the above described process with a correspondingly lower amount of p-amino salicylic acid and the product so obtained is coupled with a correspondingly lesser amount of the diazo compound of 1-aminobenzene-4-β-hydroxyethylsulfone sulfuric acid ester, a dyestuff is obtained which has a somewhat lower solubility and a bluer shade than the dyestuff described in the above example. The general properties regarding to fastness are, however, practically the same.

EXAMPLE 2

86.4 parts (0.15 mol) of copper phthalocyanine are converted to the tetrasulfochloride as described in Example 1. The slurry of the filter cake is condensed with 63 parts (0.41 mol) of p-amino salicylic acid in the manner and under the conditions described in the same example. The end volume after the condensation is 1200 parts. The condensate is salted out with 650 parts of sodium chloride, filtered and washed with a saturated aqueous solution of said salt. Then, the condensation product is redissolved in 600 ml. water to which 30 parts of sodium bicarbonate have been added.

A diazo solution from 68 parts of 1-amino-2-methoxybenzene-4-β-hydroxyethylsulfone sulfuric acid ester (molecular weight 311) is prepared in the usual way by addition of hydrochloric acid and sodium nitrite solution. This diazo compound is added over a period of 5 hours to the condensate solution prepared above. Coupling proceeds more slowly than in Example 1 and is allowed to finish overnight. The dye is salted out by addition of 200 parts of sodium chloride, filtered and washed with a saturated solution of said salt (500 ml.). The dye is dried at 70° C. and represents a dark greyish-green powder, which is easily soluble in water with a dark green color. It is suitable for printing and dyeing natural and polyamide fibers in full green shades under the conditions described in Example 1. The dyeings and prints have good properties of fastness against wet processing and light. Their hue is somewhat bluer and duller than that of the one obtained with the dye of Example 1. A chromatographic analysis shows the picture of a uniform dye.

EXAMPLE 3

57.6 parts (0.1 mol) of copper phthalocyanine are converted to the tetrasulfochloride compound as described in Example 1. The latter is condensed with 46 parts (0.3 mol) of p-amino salicylic acid at a pH of 6.5 to 6.9 with 1 part of pyridine as a catalyst as described above. The salted out condensation product is filtered, washed well with a saturated brine solution of sodium chloride and redissolved in 500 parts of water to which 35 parts of sodium bicarbonate have been added.

To the so-obtained solution there is added a diazo solution prepared in the usual way from 42 parts of 1-aminobenzene-3-β-hydroxyethylsulfone sulfuric acid ester. The coupling proceeds smoothly at 20° C. and, after stirring overnight, the dye is salted out with 250 parts of sodium chloride and filtered. It is dried at 70° C. and ground to a greyish-green powder easily soluble in water with a full bright green color. The dye is suitable for dyeing and printing natural and polyamide fibers and yields bright grass green hues under the dyeing conditions described in Example 1. The dyeings and prints have good properties against wet processing and are fast to light. A chromatographic analysis shows the uniformity of the dye. The hues of the dyeings with this dye are somewhat brighter and bluer than the ones produced with the dye of Example 1.

EXAMPLE 4

Replacement of the 1-diazobenzene-3-β-hydroxyethylsulfone sulfuric acid ester in Example 3 by equimolar amounts of 2-diazo-1,4-dimethoxybenzene-5-β-hydroxyethylsulfone sulfuric acid ester leads to a dye of a dark bluish green color. It is suitable for dyeing and printing natural and polyamide fibers under the conditions described in Example 1. The dyeings and prints have good wet processing properties and are fast to light. The hues of the dyeings are rather dull bluish green, much bluer and duller than the shade produced with the dye of Example 1.

EXAMPLE 5

126.8 parts of nickel phthalocyanine, 86.8% purity (0.193 mol), are dissolved in 316 ml. chlorosulfonic acid (4.75 mol), the temperature rising to 65° C. The solution is heated to 135° C. and kept at this temperature for 4 hours. After cooling to 50° C., 110 parts of thionylchloride are added in stages, and the temperature is brought back to 80° C. and kept at this temperature for one hour. The mass is then drowned in a mixture of 1200 parts of water and 2700 parts of ice and the temperature is kept at 0° C. or below. After filtration and thorough washing, the filter cake obtained is reslurried in 500 parts of water plus ice and fed in stages to a dye solution prepared as follows:

39 parts of 1-aminobenzene-4-β-hydroxyethylsulfone sulfuric acid ester are diazotized in the usual way by means of hydrochloric acid and sodium nitrite and coupled with 40 parts of p-amino salicylic acid, which had been dissolved previously in 300 parts of water to which 60 parts of sodium bicarbonate had been added. The coupling proceeds in the usual way, and the dye is salted out with 300 parts of sodium chloride solution, the dyecake is dissolved in 300 parts of water, 75 parts of sodium bicarbonate and 2 parts of pyridine, and the slurry of the phthalocyanine sulfochloride is fed into the solution in stages at a temperature between 10–20° C.

After completion of the reaction, as indicated by complete solubility of the mixture, the latter is stirred overnight and the dye is salted out with sodium chloride. After filtration and thorough washing with saturated sodium chloride solution, the dye is dried at 70° C. It represents a greenish color, its hue is close to the dye of Example 1 obtained from copper phthalocyanine. It is, according to the chromatographic analysis, a uniform dye and is well suited for the dyeing and printing of textile fibers. The dyeings and prints when obtained with the aid of an alkaline compound according to procedures customary for fiber-reactive dyes, possess a full green tint of very good wet processing and lightfastness properties.

When, in the above example, the nickel phthalocyanine-3,3′,3″,3‴-tetrasulfochloride is replaced by an equivalent amount of nickel phthalocyanine-4,4′,4″,4‴-tetrasulfochloride and otherwise one proceeds as described above, a similar dyestuff is obtained which has approximately the same shade and fastness properties.

EXAMPLE 6

Replacement of the 1-diazobenzene-3-β-hydroxyethylsulfone sulfuric acid ester in Example 3 by an equimolar amount of the diazo compound from p-amino sulfonylurea and coupling in sodium hydroxide solution (instead of sodium bicarbonate) leads to a fiber-reactive dye of bright green hue, which is suitable for printing and dyeing textile materials when developed by thermal heat (5–10 minutes at 145–160° C.). This dye possesses excellent wet processing properties and has a good lightfastness. A chromatographic analysis attests to the uniformity of the dye. The hue of the dyed goods represents a bright greenish color, bluer and brighter than that of the green dye in Example 1.

EXAMPLE 7

57.1 parts of nickel-phthalocyanine (0.1 mol) are dissolved in 250 parts of chlorosulfonic acid and while stirring, the temperature rises to 65° C. After solution has been achieved, the temperature is brought to 135° C., and kept at this level for 4 hours. After cooling to 40–50° C., 55 parts of thionylchloride are added in stages, and the temperature is again raised to 80° C. and kept there for one hour. The reaction mass is then poured into a mixture of 600 parts of water and 1200 parts of ice under good agitation. The temperature is kept at 0° C. or below. After filtration and good washing, the filter cake is reslurried in 300 parts of water plus ice and fed in stages to a neutralized solution of 46 parts (0.3 mol) of p-amino salicylic acid at a pH of 6.5 with 1 part of pyridine as catalyst. The condensation product is salted out with sodium chloride, washed thoroughly with saturated brine solution and redissolved in 400 parts of water to which 35 parts of sodium bicarbonate have been added. A diazo solution prepared in the usual way from 96 parts of 3-amino-4-methoxytoluene-6-β-hydroxyethylsulfone sulfuric acid ester is then added. The coupling proceeds overnight, the dye is salted out with 200 parts of sodium chloride and filtered. After drying at 70° C. and grinding, it is a greyish green powder easily soluble in water with a dark bluish green color. The dye is suitable for dyeing and printing textile fibers under the conditions customary for fiber reactive dyes and yields green tints of a covered bluish green hue.

The dyes and printed textiles have very good properties against wet processing and are fast to light.

EXAMPLE 8

55.2 parts of copper phthalocyanine (0.096 mol) are converted to the sulfochloride in the same manner as shown in Example 1. The washed filter cake is slurried in 300 parts of ice and water and added in portions to a neutralized solution of 24.4 parts of p-amino salicylic acid (0.160 mol) in 200 parts of water to which 50 parts of sodium bicarbonate and 3 parts of pyridine have been added. The temperature is kept at 5–15° C., the pH at 6.7. The condensation is finished within one hour. Then, there are added 35.4 parts of 1-aminobenzene-4-β-hydroxyethylsulfone sulfuric acid ester (0.12 mol) previously dissolved in 200 parts of water and neutralized with sodium bicarbonate. The condensation mixture is stirred overnight, salted out, filtered and washed well with saturated brine solution.

The filter cake is dissolved in 500 parts of water to which 35 parts of sodium bicarbonate have been added. A diazo solution prepared from 46 parts of 1-aminobenzene-4-β-hydroxyethylsulfone sulfuric acid ester (0.14 mol) with 38 parts of conc. hydrochloric acid and 12 parts of sodium nitrite in 200 parts of water at 0–5° C. is added. Coupling takes place over a period of 3 to 4 hours. When finished, the dye is salted out with 250 parts of sodium chloride and filtered. It is dried at 70° C. and is a dark grey powder which dissolves readily in water with a bright green color.

The dye is well suited for the printing and dyeing of textile fibers according to the procedure usual with fiberreactive dyes. It dyes with a bright green hue and the dyeings possess excellent wash fastness and are brighter than the dyeings of Example 1.

When in the above example the copper phthalocyanine-3,3′,3″,3‴-tetrasulfochloride is replaced by 93 parts (0.096 mol) cooper phthalocyanine-4,4′,4″,4‴-tetrasulfochloride and otherwise one proceeds as described above, a similar dyestuff is obtained which has a somewhat slightly bluer shade than the dyestuff mentioned in the above example. The fastness properties are, however, practically the same.

EXAMPLE 9

97 parts (0.1 mol) of copper phthalocyanine 4,4′,4″,4‴-tetrasulfochloride prepared by the action of chlorosulfonic acid on copper phthalocyanine 4,4′,4″,4‴-tetrasulfonic acid, after pouring on ice and filtration, are slurried with 500 parts of ice plus water and fed into a solution of 43 parts of p-amino salicylic acid neutralized to a pH of 6.9 in 500 parts of water with simultaneous addition of 35 parts of sodium bicarbonate. The condensation proceeds smoothly and is finished within one hour, after which the condensate is salted out with 250 parts of sodium chloride, filtered and washed with a saturated brine solution. The filter cake is then redissolved in 500 parts of water, to which 38 parts of sodium bicarbonate are added.

To this solution is added a diazo solution made in the usual way from 42 parts of 1-aminobenzene-4-β-hydroxyethylsulfone sulfuric acid ester with the help of 35 parts of conc. hydrochloric acid and 11 parts of sodium nitrite. The solution of the diazo compound—volume ca. 300 ml.— is added stepwise to the condensate over a period of 3 hours. Coupling takes place at a temperature of 10–25° C., and the reaction mixture is stirred for 12 hours. Then 250 parts of sodium chloride are added, the salted out dye is filtered, washed with saturated brine solution and dried at 70° C. When ground up, it is a dark grey powder easily soluble in water with a full green color.

The dye prints and dyes well on textile fibers when applied according to the procedures customary for fiber-reactive dyes of this class. It yields full green hues of very good fastness to wet-processing and light.

By correspondingly reducing the amount of p-amino salicylic acid and p-diazo benzene-4-β-hydroxyethylsulfone sulfuric acid ester, bluer and somewhat brighter shades of green of similiar fastness properties are obtained.

EXAMPLE 10

48.5 parts of copper-phthalocyanine 4,4′,4″,4‴-tetrasulfochloride (0.05 mol) obtained by reaction of chlorosulfonic acid with copper phthalocyanine 4,4′,4″,4‴-tetrasulfonic acid, after drowning on ice and filtration, are slurried with 300 parts of ice and water and fed into a solution of 22 parts (0.15 mol) p-amino salicylic acid in 300 parts of water neutralized to a pH of 6.8–6.9 by simultaneous addition of 20 parts of sodium bicarbonate. The condensation is finished within one hour, and then salted out with 175 parts of sodium chloride, filtered and washed with a saturated brine solution. The filter cake is redissolved in 300 parts of water and 20 parts of sodium bicarbonate are added.

To this solution is now added a diazo solution made from 21 parts of 1-aminobenzene-3-β-hydroxyethylsulfone sulfuric acid ester with the help of 20 parts of conc. hydrochloric acid and 5.5 parts of sodium nitrite in 150 parts of water over a period of 2 hours. The coupling proceeds at a temperature of 20° C. and, when finished, the condensate is salted out with 180 parts of sodium chloride. After filtration and washing with a saturated brine solution, the filter cake is dried at 70° C. The dye is a dark green powder easily soluble in water with a full bright green color.

When applied according to the procedures customary for fiber-reactive dyes of this class, it yields full bright green prints and dyes on textiles, which have very good fastness to wet processing and to light.

I claim:

1. A water-soluble, fiber-reactive phenylazophthalocyanine dye corresponding to the formula

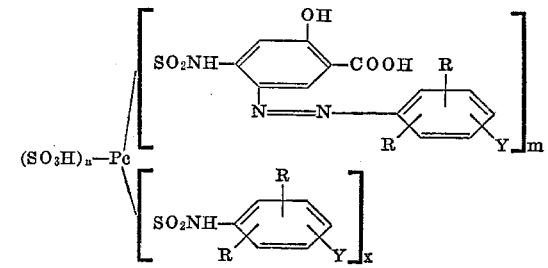

wherein Pc stands for copper or nickel phthalocyanine in which the substituted sulfonamide groups and —SO₃H groups are in the 3- or 4-positions, $m$ stands for an integer from 1 to 4 inclusive, $n$ stands for a numeral from 0 to 3 inclusive, $x$ stands for 0 or 1, the sum of $m+n+x$ being 3 or 4, R stands for hydrogen, lower alkyl or lower alkoxy and Y stands for —SO₂CH₂CH₂OSO₃H, SO₂CH=CH₂ or —SO₂NHCONH₂.

2. The water-soluble, fiber-reactive phthalocyanine dye of the formula

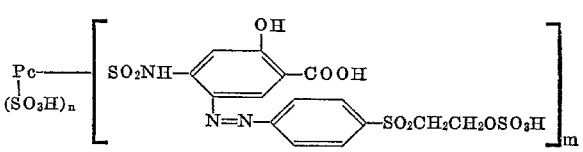

in which the sum of $m$ and $n$ is 4 and Pc represents copper-phthalocyanine substituted in the 3,3′,3″,3‴-positions.

3. The water-soluble, fiber-reactive phthalocyanine dye of the formula

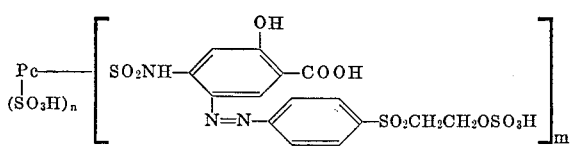

in which the sum of $m$ and $n$ is 4 and Pc represents copper-phthalocyanine substituted in the 4,4′,4″,4‴-positions.

4. The water-soluble, fiber-reactive phthalocyanine dye of the formula

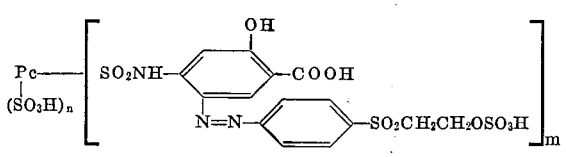

in which the sum of $m$ and $n$ is 4 and Pc represents nickel-phthalocyanine substituted in the 3,3′,3″,3‴-positions.

5. The water-soluble, fiber-reactive phthalocyanine dye of the formula

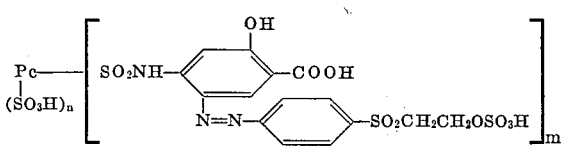

in which the sum of $m$ and $n$ is 4 and Pc represents nickel-phthalocyanine substituted in the 4,4′,4″,4‴-positions.

6. The water-soluble, fiber-reactive phthalocyanine dye of the formula

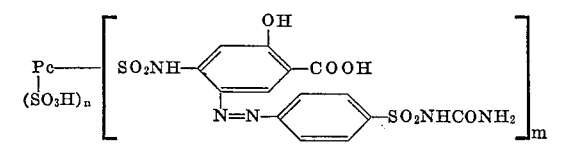

in which the sum of $m$ and $n$ is 4 and Pc represents copper-phthalocyanine substituted in the 3,3′,3″,3‴-positions.

7. The water-soluble, fiber-reactive phthalocyanine dye of the formula

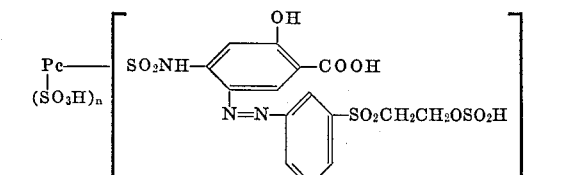

in which the sum of $m$ and $n$ is 4 and Pc represents copper-phthalocyanine substituted in the 3,3′,3″,3‴-positions.

8. The water-soluble, fiber-reactive phthalocyanine dye of the formula

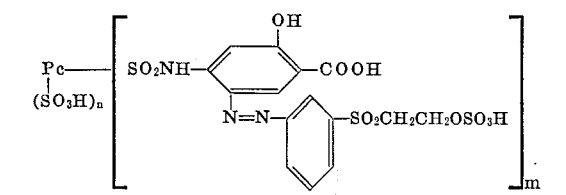

in which the sum of $m$ and $n$ is 4 and Pc represents copper-phthalocyanine substituted in the 4,4′,4″,4‴-positions.

9. The water-soluble, fiber-reactive phthalocyanine dye of the formula

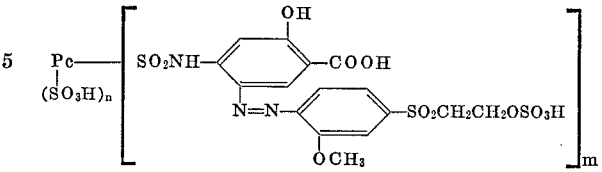

in which the sum of $m$ and $n$ is 4 and Pc represents copper-phthalocyanine substituted in the 3,3′,3″,3‴-positions.

10. The water-soluble, fiber-reactive phthalocyanine dye of the formula

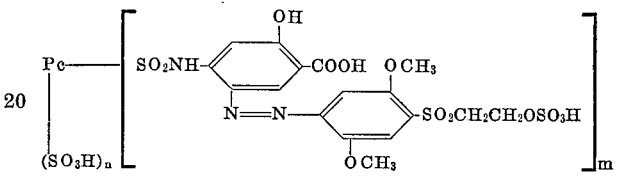

in which the sum of $m$ and $n$ is 4 and Pc represents copper-phthalocyanine substituted in the 3,3′,3″,3‴-positions.

11. The water-soluble, fiber-reactive phthalocyanine dye of the formula

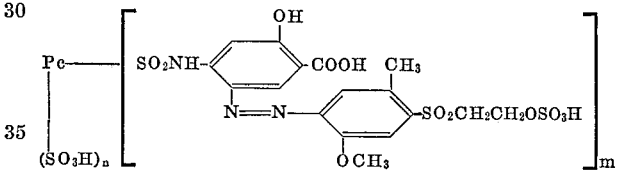

in which the sum of $m$ and $n$ is 4 and Pc represents nickel-phthalocyanine, substituted in the 3,3′,3″,3‴-positions.

12. The water-soluble, fiber-reactive phthalocyanine dye of the formula

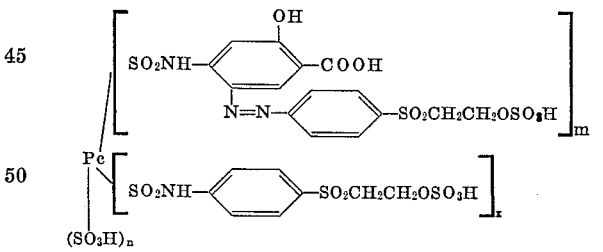

in which the sum of $m$, $n$ and $x$ is 4 and Pc represents a copper-phthalocyanine nucleus substituted in 3,3′,3″,3‴-positions.

13. The water-soluble, fiber-reactive phthalocyanine dye of the formula

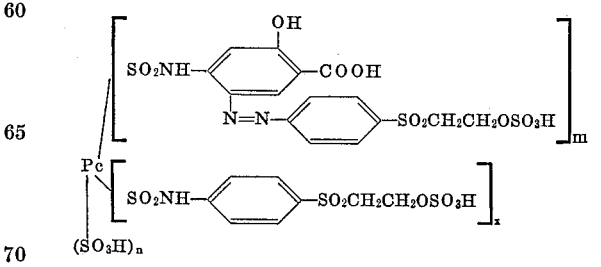

in which the sum of $m$, $n$ and $x$ is 4 and Pc represents a copper-phthalocyanine nucleus substituted in the 4,4′,4″,4‴-positions.

(References on following page)

References Cited

UNITED STATES PATENTS

| | | | |
|---|---|---|---|
| 3,013,006 | 12/1961 | Biemert et al. | 260—146 XR |
| 3,132,129 | 5/1964 | Dortmann et al. | 260—147 |
| 3,133,050 | 5/1964 | Von Tobel | 260—146 |
| 3,278,548 | 10/1966 | Kuhne et al. | 260—146 XR |

FLOYD D. HIGEL, Primary Examiner

U.S. Cl. X.R.

260—314.5, 207, 458, 553; 8—41, 42, 43, 13; 117—144, 138.8, 142